United States Patent

[11] 3,624,049

| [72] | Inventors | John J. Ventura<br>Eatontown;<br>James Mackey, Colonia, both of N.J. |
|---|---|---|
| [21] | Appl. No. | 835,793 |
| [22] | Filed | June 23, 1969 |
| [45] | Patented | Nov. 30, 1971 |
| [73] | Assignee | M & T Chemicals, Inc.<br>New York, N.Y. |

[54] THE PREPARATION OF POLY (ETHYLENE TEREPHTHALATE) USING TRIVALENT ANTIMONY COMPOUNDS AS CATALYSTS
16 Claims, No Drawings

[52] U.S. Cl. .................................................. 260/78.4 E,
260/75 R, 252/431 R
[51] Int. Cl. ........................................................ C08g 17/06
[50] Field of Search ............................................ 260/78.4 E,
75 C, 2 M, 80 L; 252/431 C

[56] References Cited
UNITED STATES PATENTS
3,024,220  3/1962  Cramer ........................ 260/75

Primary Examiner—Joseph L. Schofer
Assistant Examiner—John Kight, III
Attorneys—Lewis C. Brown, Kenneth G. Wheeless and Robert P. Grindle ABSTRACT: A process for preparing polyethylene terephthalate wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of a trivalent antimony compound exhibiting two direct carbon to antimony bonds and one direct bond from an antimony atom to oxygen; to oxygen linking an organic radical to said antimony atom; to oxygen linking another antimony atom to said antimony atom; or to a halogen atom.

THE PREPARATION OF POLY (ETHYLENE TEREPHTHALATE) USING TRIVALENT ANTIMONY COMPOUNDS AS CATALYSTS

ORGANOANTIMONY CATALYST

This invention relates to an improved method for the preparation of polyethylene terephthalate. More particularly, this invention relates to an improved polycondensation catalyst system for use in the manufacture of polyethylene terephthalate said novel catalytic composition comprising an oxygen containing diorganoantimony compound.

It is known that polyethylene terephthalate can be prepared from a suitable methyl ester of terephthalic acid formed by initially reacting methyl alcohol with terephthalic acid. When a methyl ester of terephthalic acid is used as a starting material, it is first reacted with ethylene glycol in the presence of a transesterification catalyst by means of an ester interchange reaction. When terephthalic acid, itself, is used as a starting material, it is subjected to a direct esterification reaction with ethylene glycol in the presence of what is generally called the first stage catalytic additive or ether inhibitor. In either method the resulting reaction product, an ester, is then polycondensed in the presence of a polycondensation catalyst to form polyethylene terephthalate.

An object of this invention is to provide a process for the rapid preparation of polyethylene terephthalate.

It is a further object to provide a catalyst for producing polyethylene terephthalate which is hydrolytically stable, soluble in ethylene glycol, and highly reactive.

These and other objects are accomplished in the practice of the present invention which is to prepare polyethylene terephthalate by a direct esterification reaction between terephthalic acid and ethylene glycol or by a transesterification reaction between the methyl ester of terephthalic acid and ethylene glycol to form an ester and the polycondensation of said ester in the presence of a trivalent antimony compound exhibiting two direct carbon to antimony bonds and one direct bond from an antimony atom to oxygen; to oxygen linking an organic radical to said antimony atom, oxygen linking another antimony atom to said antimony atom or to a halogen atom.

The antimony alcoholate catalysts are soluble in ethylene glycol in catalytic quantities, i.e. up to about 1 percent based upon the weight of terephthalic acid. The catalysts of this invention are soluble in hot ethylene glycol at temperatures up to 200° C. The diorganoantimony catalysts of this invention are termed, generally, homogeneous catalysts because their solubility in the system provides a homogeneous system as contrasted with a heterogeneous system in which catalysts are not soluble in ethylene glycol.

The amount of diorganoantimony compound can be varied over wide concentrations. As is usual with catalysts, the amount will be relatively small. As a general rule, the amount will be within the range of from 0.003 to 3.50 percent based upon the weight of bis($\beta$-hydroxyethyl) terephthalate used. The preferred range is from 0.006 to 3.40 percent, based upon the weight of bis($\beta$-hydroxyethyl) terephthalate, to give a satisfactory reaction rate and a product of suitable viscosity and color.

In general, the diorganoantimony compounds which may be used in the practice of this invention include salts of antimony and inorganic acids or organic acids. These include diorganoantimony salts of aliphatic and aromatic monocarboxylic acids. Typical of the antimony compounds which may be employed are diphenylantimony 2-ethylhexanoate, diphenylantimony chloride, diphenylantimony oxide, bis(diphenylantimony) oxide, diphenylantimony p-chlorobenzoate, and diphenylantimony acetate.

The antimony compound is of the formula $R_2Sb(Y)$ wherein Y is selected from the group consisting of —OOCR', —O, halogen, —OR', —OSbR$_2$, wherein R and R' are independently selected from the group consisting of alkyl, alkenyl, cycloalkyl, aralkyl, aryl, alkaryl, including such radicals when inertly substituted. The antimony compounds encompassed by this invention are trivalent antimony compounds.

The antimony compounds include those of the formulae:
$R_2SbX$
$R_2Sb(OOCR')$
$R_2Sb(OR')$
$(R_2Sb)_2O$ wherein R and R' are as defined above and x is halogen or oxygen.

In these compounds, R and R' are hydrocarbon radicals preferably selected from the group consisting of alkyl, alkenyl, cycloalkyl, aralkyl, aryl, alkaryl, including such radicals when inertly substituted. Alkyls are typically straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, i.e. octyls and lower. Typical alkenyls include vinyl, allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. Typical cycloalkyls include cyclopentyl, cyclohexyl, cycloheptyl, cyclooctyl, etc. When R is aralkyl, it may typically be benzyl, $\beta$-phenylethyl, Y-phenylpropyl, $\beta$-phenylpropyl, etc. Typical aryls include phenyl, naphthyl, etc. Typical alkaryls include tolyl, xylyl, p-ethylphenyl, p-nonylphenyl, etc. R and R' may be inertly substituted, e.g. may bear nonreactive substituents such as alkyl, aryl, cycloalkyl, aralkyl, alkaryl, alkenyl, ether, halogen, nitro, ester, etc. Typical substituted alkyls include 3-chloropropyl, 2-ethoxyethyl, carboethoxymethyl, etc. Substituted alkenyls include 4-chlorobutyl, Y-phenylpropyl, chloroallyl, etc. Substituted cycloalkyls include 4-methylcyclohexyl, 4-chlorocyclohexyl, etc. Inertly substituted aryl includes chlorophenyl, anisyl, biphenyl, etc. Inertly substituted aralkyl includes chlorobenzyl, p-phenylbenzyl, p-methylbenzyl, etc. Inertly substituted alkaryl includes 3-chloro-5-methylphenyl, 2,6-di-tert-butyl-4-chlorophenyl, etc.

Among the antimony compounds used in the practice of this invention are diorganoantimony carboxylates.

The anionic component of the antimony carboxylate is expressed in simplest form as $R'''(COO^-)_n$ wherein $R'''$ represents a hydrocarbon group, typically an aliphatic or cycloaliphatic group such as alkyl, alkenyl, etc., and corresponding cyclic groups such as cycloalkyl, etc. groups; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. Other equivalent groups may be employed. Preferably n is 1 and the acid is monobasic. n may be a small whole integer, typically 1, 2, 3, etc. In the preferred embodiment, $R'''$ may be an alkyl group having less than about 20 carbon atoms. Typical of the acids from which the antimony salts may be prepared may be acetic acid, propionic acid, butyric acid, caproic acid, caprylic acid, capric acid, stearic acid, oleic acid, etc. Naphthenic acid may be employed. The commercially occurring mixture of acids known as tall oil fatty acids are preferred in the practice of this invention.

It is preferred that the antimony carboxylate be formed from an amount of acid sufficient to satisfy each of the valence bonds of the antimony metal. The salts which may be used in practice of this invention may be those materials prepared for example by neutralizing a basic compound of the metal, typically the hydroxide or oxide.

Specific antimony compounds operable in the practice of this invention include:
diphenylantimony acetate
diphenylantimony propionate
diphenylantimony butyrate
ditolylantimony $\alpha$-methylpropionate
dixylylantimony $\alpha$-methylpropionate
di-$\alpha$-naphthylantimony acetate
ditolylantimony butyrate
bis(p-chlorophenyl) antimony Y-chlorobutyrate
$\beta$-ethoxypropionate
diethylantimony acetate di-n-propylantimony propionate
di-n-butylantimony α-methylpropionate
di-n-octylantimony propionate
dilaurylantimony butyrate
bis(2-ethylhexyl) antimony α-methylpropionate
di-n-hexylantimony acetate
diallylantimony acetate
di-2-butenylantimony propionate
dibenzylantimony α-methylpropionate
dicyclohexylantimony acetate
diphenylantimony valerate
diphenylantimony caproate
ditolylantimony α-methylvalerate
dixylylantimony β-methylvalerate
diethylantimony α-ethylcaproate
di-n-propylantimony caprylate
di-n-butylantimony caprate
di-α-naphthylantimony pelargonate
di-n-octylantimony laurate
dilaurylantimony stearate
di-2-ethylhexylantimony oleate
di-n-hexylantimony benzoate
diallylantimony p-toluate
di-2-butenylantimony p-ethylbenzoate
dibenzylantimony α-naphthoate
dicyclohexylantimony phenylacetate
diphenylantimony phenoxyacetate
diphenylantimony linoleate
ditolylantimony cyclohexanoate
diphenylantimony tetrachlorobenzoate
diphenylantimony tallate
ditolylantimony rosinate
bis(p-chlorophenyl) antimony pelargonate
diphenylantimony p-chlorobenzoate
dimethylchlorostibine
dibutylchlorostibine
dioctylchlorostibine
diphenylchlorostibine
dibutylbutoxystibine
dibutylacetoxystibine
diphenylacetoxystibine
bis(dimethylantimony) oxide
bis(dibutylantimony) oxide
bis(dioctylantimony) oxide
bis(diphenylantimony) oxide
bis(dibutylantimony) sulfide
bis(diphenylantimony) sulfide Apart from the enhancement of the color characteristics and rate of polycondensation by the novel catalyst system of this invention, the thermal stability of the resulting polymers is greatly enhanced since compounds comprising the catalyst system remain in the polymer. The presence of the novel catalyst system of this invention greatly enhances subsequent processing operations such as the spinning of fibers and the casting of films which operations are carried out from a polymer melt at elevated temperatures.

The preparation of esters by an ester interchange reaction is generally carried out with a molar ratio of ethylene glycol to dimethyl terephthalate of from about 1:1 to 15:1, respectively, but preferably from about 2:1 to 3:1. The transesterification reaction is generally carried out at atmospheric pressure in an inert atmosphere such as nitrogen, initially at a temperature range of from about 125° C. to 290° C. but preferably around 150° C. to 260° C. in the presence or absence of a transesterification catalyst. During the first stage, methyl alcohol is evolved and is continually removed by distillation. Employing procedures heretofore known in the art, the ester interchange portion of the reaction or the first step, requires approximately 1 to 5 hours.

Any known suitable transesterification catalyst may be used in the first stage. The transesterification catalyst is used in concentrations from about 0.01 percent to 0.2 percent based on the weight of the dimethyl terephthalate used in the initial reaction mixture. Although the novel catalysis of this invention are not, themselves, esterification interchange catalysts, they may, in general be added with the esterification interchange catalyst if desired.

The preparation of esters of terephthalic acid and ethylene glycol by direct esterification reaction is generally carried out with a molar ratio of ethylene glycol to terephthalic acid of from about 1:1 to 15:1, preferably about 2:1 to 3.1. The direct esterification reaction is carried out at temperatures ranging from about 170° C. to 290° C. in the absence of an oxygen containing atmosphere at atmospheric or elevated pressures for about 1 to 3 hours to form the desired ester product. Air is removed, for example, by purging with nitrogen or other oxygen free inert gas. The polycondensation step, or the polymerization step, of the present invention is effected by adding the novel catalyst of this invention to an ester, bis(2-hydroxyethyl) terephthalate, and heating the mixture thereof under reduced pressure within the range of from about 0.001 millimeters to 10 millimeters of mercury, while being agitated at a temperature from about 250° C. to 330° C. for from 1 to 4 hours. In accordance with this invention, the novel catalyst is generally employed in amounts ranging from about 0.001 percent to 3.2 percent based on the weight of the ester to be condensed. Higher or lower concentrations of the novel catalyst mixture of this invention can also be used in the subject polycondensation reaction.

The following examples illustrate this invention particularly with respect to the preparation of highly polymeric polyethylene terephthalate by starting with bis(β-hydroxyethyl) terephthalate. The catalyst of this invention is also operable in catalyzing the polymerization of other esters of terephthalic acid such as the ethyl, propyl, butyl, and phenyl esters. The polymerization of esters of other organic acid compounds are also catalyzed by the novel catalyst system of this invention. These include esters of adipic acid, butyric acid, sebacic acid, maleic acid, tetrachlorophthalic acid, phthalic acid, cyclohexane, carboxylic acid, cyclohexane dicarboxylic acid, benzoic acid, paramethyl benzoic acid, etc. Anhydrides and half esters of these acids may be employed. In practice of the invention, the term "acid compound" may herein be used to include these anhydrides and half esters as well as the acids. Typical of the anhydrides may be phthalic anhydride, acetic anhydride, maleic anhydride, etc.; typical of the half esters may be, e.g. isooctyl acid phthalate, isooctyl acid maleate, etc.

EXAMPLE 1

This example illustrates a complete two-step process in the preparation of polyethylene terephthalate from dimethyl terephthalate and ethylene glycol.

Two thousand parts by weight of dimethyl terephthalate, 1,400 parts by weight of ethylene glycol, and 0.3 parts by weight of zinc acetate were heated in a 3-necked flask, equipped with a stirrer and a condenser, at atmospheric pressure until that quantity of methanol theoretically calculated to evolve had been distilled off (viz 836 milliliters of methanol). The zinc acetate esterification catalyst was sequestered by adding 1.38 parts of tri-nonylphenyl phosphite, stirring and heating the reaction mixture for 15 minutes. The bis(β-hydroxyethyl) terephthalate product was then isolated.

Twenty five point zero grams of the bis(β-hydroxyethyl) terephthalate monomer and 0.0207 grams of diphenylantimony acetate were added to a polyester reactor preheated to 260° C. The temperature of the reactor was then adjusted to 280° C. simultaneously with the application of a vacuum of 0.5 millimeters of mercury. The polymerization was allowed to proceed for 150 minutes. The ethylene glycol formed as a result of the polymerization was distilled off and collected. Upon cooling, the polyethylene terephthalate product exhibited an intrinsic viscosity of 0.53 and a melting point of 262° C.

EXAMPLE 2

The process of example 1 was followed except that the charge to the polymerization reactor consisted of 50.0 grams of bis($\beta$-hydroxyethyl) terephthalate and 0.0175 grams of bis(diphenylantimony) oxide. The polymerization reaction was allowed to proceed for 2 hours. Upon cooling, the polyethylene terephthalate product exhibited an intrinsic viscosity of 0.80 and a melting point of 260° C.

EXAMPLE 3

The process of example 1 was followed except that the charge added to the polymerization reactor consisted of 25 grams of bis($\beta$-hydroxyethyl) terephthalate and 0.0258 grams of diphenylantimony 2-ethylhexanoate (0.03 percent of the weight of the monomer). The polymerization reaction was allowed to proceed for 2 hours. Upon cooling the polyethylene terephthalate product exhibited an intrinsic viscosity of 0.48 and a melting point of 263° C. to 264° C.

EXAMPLE 4

The process of example 1 was followed except that the charge to the polymerization reactor consisted of 25.0 grams of bis($\beta$-hydroxyethyl) terephthalate and 0.0266 grams of diphenylantimony p-chlorobenzoate. The polymerization reaction was allowed to proceed for 2 hours. Upon cooling, the polyethylene terephthalate product exhibited an intrinsic viscosity of 0.77 and a melting point of 264° C.

EXAMPLE 5

The process of example 1 was followed except that the charge added to the polymerization reactor consisted of 25.0 grams of bis($\beta$-hydroxyethyl) terephthalate and 0.0192 grams of diphenylantimony chloride. The polymerization reaction was allowed to proceed for 6 hours. Upon cooling the polyethylene terephthalate product exhibited an intrinsic viscosity of 0.10 and a melting point of 259° C.

The products of this invention exhibit enhanced flame resistance. As an added feature of this invention the novel catalyst of this invention act as internal lubricants such that the spinning of the products into fibers is greatly facilitate.

Although this invention has been illustrated by reference to specific examples, numerous changes and modifications thereof which clearly fall within the scope of the invention will be apparent to those skilled in the art.

Claims:

1. A process for preparing poly(ethylene terephthalate) wherein dimethyl terephthalate is reacted with ethylene glycol to form an ester of ethylene glycol and terephthalic acid or where terephthalic acid is reacted with ethylene glycol to form an ester of terephthalic acid and ethylene glycol where the resulting ester is polycondensed in the presence of a polycondensation catalyst, the improvement comprising carrying out the condensation or polymerization of the ester in the presence of a catalytic amount of a trivalent antimony compound of the formula $R_2Sb(Y)$ wherein Y is selected from the group consisting of OOCR', —O, halogen, —OR', —OSbR$_2$ wherein R and R' are independently selected from the group consisting of alkyl, alkenyl, cycloalkyl, aralkyl, aryl, alkaryl, including such radicals when inertly substituted.

2. The process of claim 1 wherein said antimony compound is of the formula $R_2Sb(OOCR')$ wherein R and R' are hydrocarbons.

3. The process of claim 1 wherein said antimony compound is diarylantimony carboxylate.

4. The process of claim 3 wherein said antimony compound is diphenylantimony acetate.

5. The process of claim 3 wherein said antimony compound is diphenylantimony p-chlorobenzoate.

6. The process of claim 3 wherein said antimony compound is diphenylantimony 2-ethylhexanoate.

7. The process of claim 1 wherein said antimony compound is of the formula $R_2SbX$ wherein R is a hydrocarbon and X is selected from the group consisting of oxygen and halogen.

8. The process of claim 7 wherein said antimony compound is diarylantimony chloride.

9. The process of claim 7 wherein said antimony compound is diphenylantimony chloride.

10. The process of claim 7 wherein said antimony compound is dialkylantimony oxide.

11. The process of claim 7 wherein said antimony compound is diarylantimony oxide.

12. The process of claim 7 wherein said antimony compound is diphenylantimony oxide.

13. The process of claim 1 wherein said antimony compound is of the formula $(R_2Sb)_2O$ wherein R is a hydrocarbon.

14. The process of claim 13 wherein said antimony compound is bis(dialkylantimony) oxide.

15. The process of claim 13 wherein said antimony compound is bis(diarylantimony) oxide.

16. The process of claim 13 wherein said antimony compound is bis(diphenylantimony) oxide.

* * * * *